United States Patent [19]
Carlson

[11] Patent Number: 5,738,781
[45] Date of Patent: Apr. 14, 1998

[54] HOUSEHOLD WASTE WATER TREATMENT AND RECYCLING SYSTEM

[76] Inventor: Terumi Carlson, 1120 S. 299th Pl., Federal Way, Wash. 98003

[21] Appl. No.: 699,603

[22] Filed: Aug. 19, 1996

[51] Int. Cl.[6] .................................................. C02F 3/28
[52] U.S. Cl. ........................ 210/170; 210/188; 210/265; 210/532.2
[58] Field of Search .................................. 210/170, 188, 210/256, 257.1, 258, 259, 265, 284, 286, 299, 305, 521, 532.2

[56] References Cited

U.S. PATENT DOCUMENTS

| | | | |
|---|---|---|---|
| 644,047 | 2/1900 | Almyrst | 210/284 |
| 1,182,465 | 3/1916 | Evans | 210/286 |
| 1,738,521 | 12/1929 | Bomhoff | 210/265 |
| 1,851,030 | 3/1932 | Adams | 210/188 |
| 2,782,604 | 2/1957 | Mixon | 210/532.2 |
| 2,792,125 | 5/1957 | Gallacher | 210/532.2 |
| 4,100,073 | 7/1978 | Hopcroft | 210/532.2 |
| 4,166,791 | 9/1979 | Marvin | 210/188 |
| 4,599,167 | 7/1986 | Benjes et al. | 210/188 |
| 4,997,562 | 3/1991 | Warner | 210/532.2 |
| 5,575,908 | 11/1996 | Mondrayon, Jr. | 210/265 |

*Primary Examiner*—Christopher Upton

[57] ABSTRACT

A household waste water treatment and recycling system comprising a rigid septic tank having a hollow body with a top opening and a lid secured over the top opening to thereby create an enclosed gas chamber, the body having first, second, third, and fourth chambers formed therein, and with the third chamber having a layer of granulated charcoal disposed therein and the fourth chamber having gravel disposed therein, the body further having an input port formed thereon and placed in communication with the first chamber, and a filtering port thereon allowing communication between the third and the fourth chambers, and an output port formed thereon placed in communication with the fourth chamber, the input port securable to a waste water line of a home for allowing waste water to enter the body, and the output port allowing treated water to exit the body, and with the lid having an evacuation outlet formed thereon, the septic tank further having a first channel for allowing communication between the first chamber and the second chamber, a second channel for allowing communication between the second chamber and the third chamber, a third channel for allowing communication between the third chamber and the fourth chamber.

2 Claims, 4 Drawing Sheets

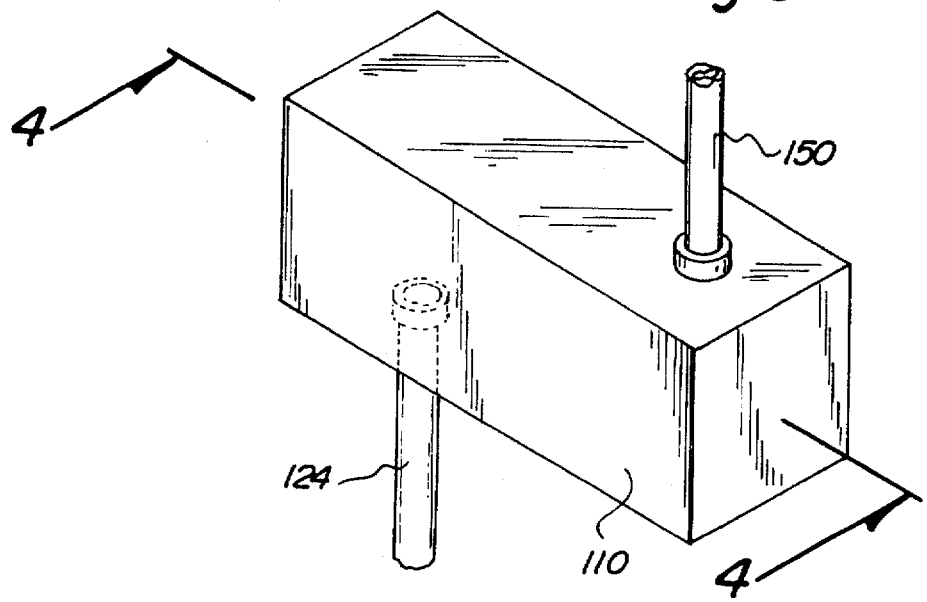
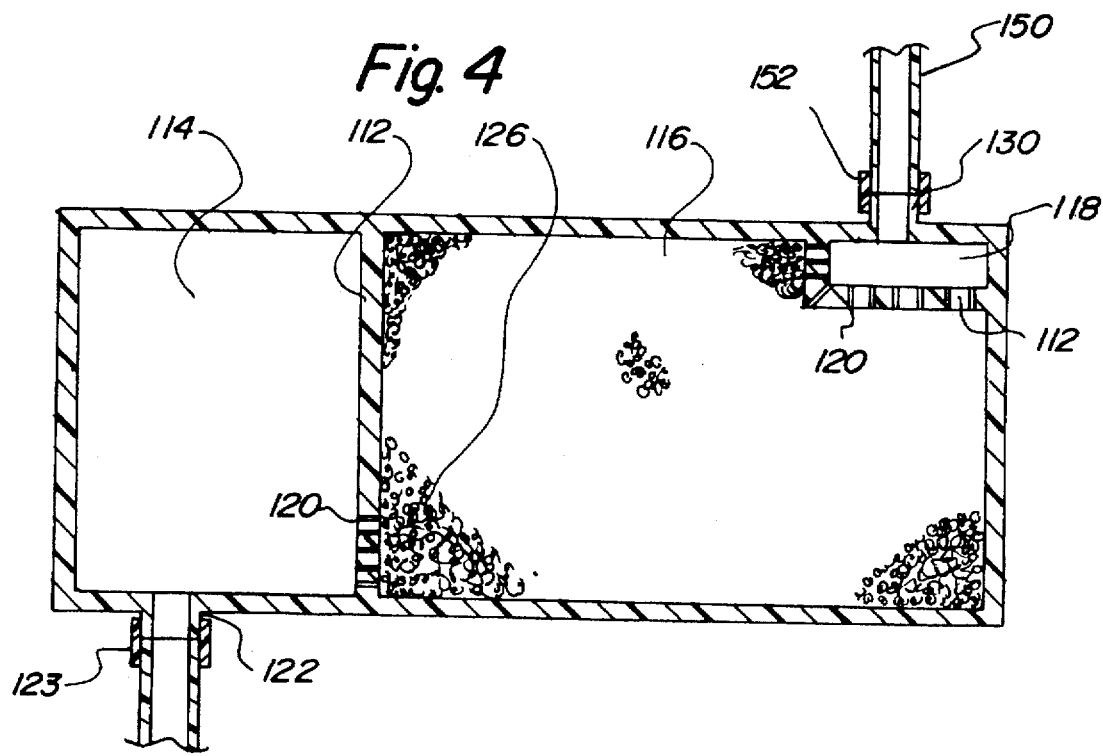

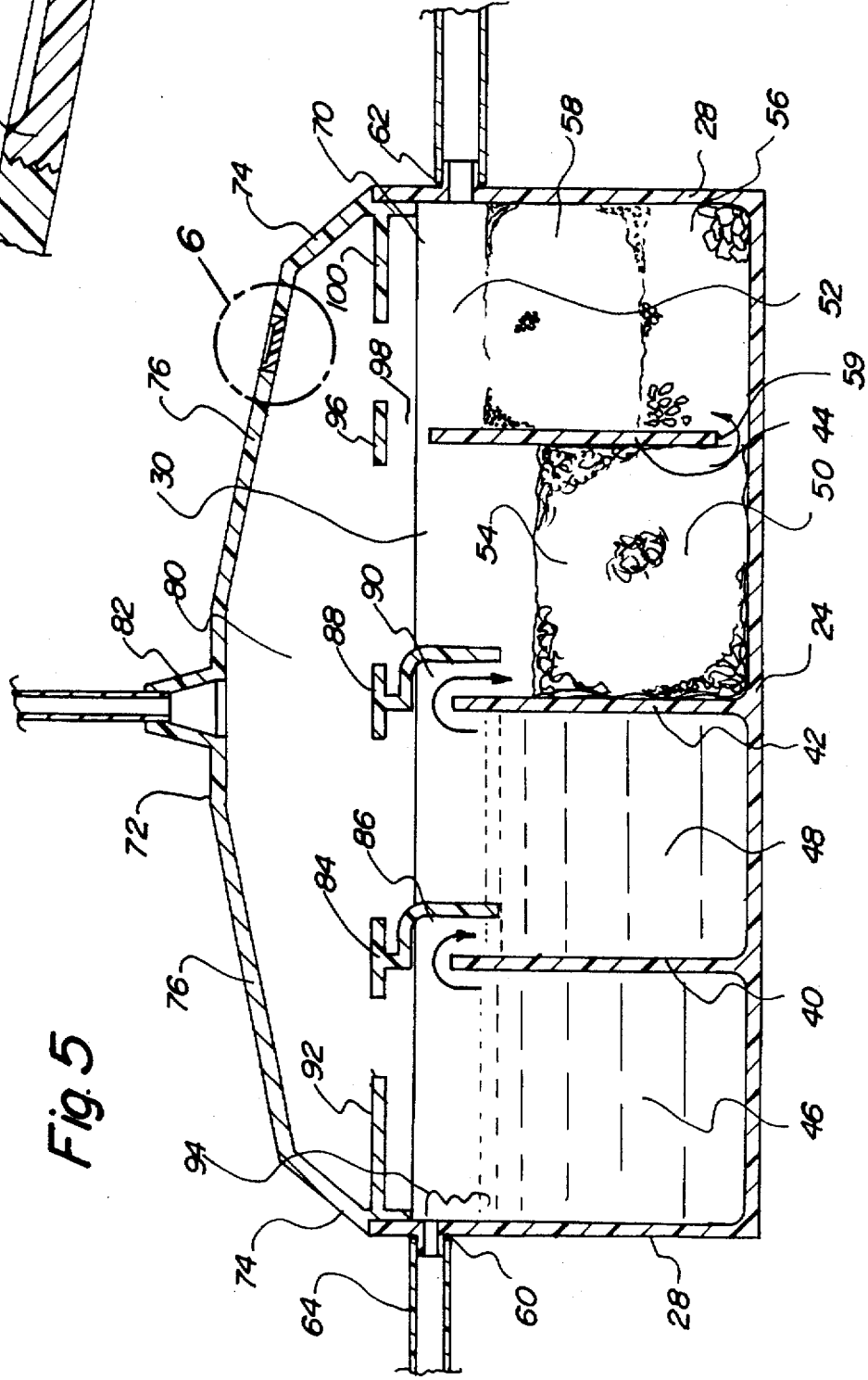

5,738,781

HOUSEHOLD WASTE WATER TREATMENT AND RECYCLING SYSTEM

BACKGROUND OF THE INVENTION

1. Field of the Invention

The present invention relates to a household waste water treatment and recycling system and more particularly pertains to allowing household waste water to be treated and then recycled with a household waste water treatment and recycling system.

2. Description of the Prior Art

The use of waste water treatment systems is known in the prior art. More specifically, waste water treatment systems heretofore devised and utilized for the purpose of treating and recycling waste water and sewage are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,210,528 to Coviello et al. discloses a closed loop waste treatment and recycling toilet system. U.S. Pat. No. 4,834,879 to Stegall et al. discloses a two-stage waste water treatment system for single family residences and the like. U.S. Pat. No. 5,171,434 to Anderson, Jr. et al. discloses an effluent recycling sanitation system. U.S. Pat. No. 5,240,597 to Ueda discloses a waste water treatment equipment. U.S. Pat. No. 5,254,246 to Rivelli et al. discloses a water reclamation system. U.S. Pat. No. 5,261,933 to Greene discloses a vent gas deodorizing system.

While these devices fulfill their respective, particular objective and requirements, the aforementioned patents do not describe a household waste water treatment and recycling system that is simple in design and allows both treated waste water and combustible gas collected from the treatment process to be used by a household.

In this respect, the household waste water treatment and recycling system according to the present invention substantially departs from the conventional concepts and designs of the prior art, and in doing so provides an apparatus primarily developed for the purpose of allowing household waste water to be treated and then recycled.

Therefore, it can be appreciated that there exists a continuing need for new and improved household waste water treatment and recycling system which can be used for allowing household waste water to be treated and then recycled. In this regard, the present invention substantially fulfills this need.

SUMMARY OF THE INVENTION

In the view of the foregoing disadvantages inherent in the known types of waste water treatment systems now present in the prior art, the present invention provides an improved household waste water treatment and recycling system. As such, the general purpose of the present invention, which will be described subsequently in greater detail, is to provide a new and improved household waste water treatment and recycling system and method which has all the advantages of the prior art and none of the disadvantages.

To attain this, the present invention essentially comprises, in combination, a rigid septic tank securable within a section of ground near a home. The septic tank has a hollow rectangular box-shaped body with a top opening and a lid secured over the top opening. The body of the septic tank has a rectangular horizontal bottom wall with two spaced opposed rectangular vertical side walls and two spaced opposed rectangular vertical short end walls extending upwards therefrom to define a hollow interior. The body of the septic tank also includes a first, a second, and a third vertical interior wall extended across the interior and coupled between the side walls to create a first chamber, a second chamber, a third chamber, and a fourth chamber, respectively. The third chamber has a layer of granulated charcoal disposed therein, and the fourth chamber has a lower layer of course gravel disposed therein and an upper layer of fine gravel disposed therein. The third interior wall has a filtering port formed thereon on a lower extent thereof for allowing communication between the third and fourth chambers.

The body of the septic tank additionally includes an input port formed on one of the end walls and is placed in communication with the first chamber. An output port is formed on the other end wall and is placed in communication with the fourth chamber. The input port is securable to a waste water line of the home for allowing waste water to enter the body. The output port allows treated water to exit the body.

The lid has two spaced opposed vertical long walls with an upper horizontal rectangular top wall, a pair of opposed angled lower rectangular ends walls, and a pair of opposed angled intermediate walls extended therebetween to create a gas chamber. The gas chamber is located above the interior of the body of the septic tank. The lid also has an upper extent with a centrally located evacuation outlet formed thereon and a lower extent. The lower extent of the lid has a first dividing wall coupled thereto at a location above the first interior wall of the body. The first dividing wall is extended downwards into the second chamber to create a first channel for allowing communication between the first chamber and the second chamber. A second dividing wall is coupled to the lid at a location above the second interior wall of the body and extended downwards into the third chamber to create a second channel for allowing communication between the second chamber and the third chamber. A first horizontal planar partition is coupled to the lid at a location above the first chamber of the body for mitigating splash of waste water entering through the input port. A second horizontal planar partition is coupled to the body at a location above the third interior wall of the body to thereby define a third channel for regulating flow of water between the third chamber and the fourth chamber. A third horizontal planar partition is coupled to the lid at a location above the fourth chamber of the body for regulating flow of recycled water exiting through the output port. Lastly, an openable door is removably secured to the intermediate wall of the lid and is located above the fourth chamber for allowing access to the water in the fourth chamber for testing purposes.

The first chamber accepts waste water from the waste water line via the input port. The second chamber accepts the waste water from the first chamber via the first channel after it has aged a time. The gas chamber accepts combustible gas that is generated from aging the waste water. The third chamber accepts the aged waste water from the second chamber via the second channel. The layer of granulated charcoal within the third chamber eliminates noxious odors present in the aged waste water. The fourth chamber accepts the aged waste water from the third chamber via the third channel. The layer of course gravel in the fourth chamber removes course particulates contained within the aged waste water. The layer of fine gravel in the fourth chamber removes fine particulates contained within the aged waste water to thereby create treated water. The output port receives the treated water from the fourth chamber, and the evacuation outlet receives combustible gas from the gas chamber.

A rigid hollow rectangular box-shaped gas filtering chamber is included and positioned above the septic tank. The gas filtering chamber has a pair of spaced interior walls secured thereacross to define a first holding cell, a centrally located second holding cell, and a third holding cell. Each interior wall has a plurality of channels formed thereon for allowing communication between the first and the second holding cells and the second and the third holding cells, respectively. The gas holding chamber further includes an input port formed thereon in communication with the first holding cell and coupled to the evacuation outlet of the septic tank with a pipe for receiving combustible gas therefrom. The gas holding chamber also has an amount of granulated charcoal disposed within the second holding cell for removing noxious fumes from the combustible gas. Lastly, the gas chamber has an output port in communication with the third holding cell for receiving filtered combustible gas exiting the second holding cell.

A gas holding tank is included and positioned above the gas filtering chamber. The gas holding tank has an input port coupled to the output port of the gas filtering chamber with a pipe for receiving and storing the filtered combustible gas. The gas holding tank also has an output port securable to a gas line of the home for providing access to the combustible gas for use.

A water holding tank is provided. The water holding tank has an input port coupled to the output port of the septic tank with a pipe for receiving and storing the treated water. It also has an output port for delivering the treated water.

Lastly, an electric water pump is included. The pump is coupleable to an external electric power source. The pump has an input port securable to the output port of the water holding tank and an output port securable to a faucet line of the home. The pump is used to transfer the treated and recycled water from the water holding tank to the faucet line for reuse.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved household waste water treatment and recycling system which has all the advantages of the prior art waste water treatment systems and none of the disadvantages.

It is another object of the present invention to provide a new and improved household waste water treatment and recycling system which may be easily and efficiently manufactured and marketed.

It is a further object of the present invention to provide a new and improved household waste water treatment and recycling system which is of durable and reliable construction.

An even further object of the present invention is to provide a new and improved household waste water treatment and recycling system which is susceptible of a low cost of manufacture with regard to both materials and labor, and which accordingly is then susceptible of low prices of sale to the consuming public, thereby making such a household waste water treatment and recycling system economically available to the buying public.

Still yet another object of the present invention is to provide a new and improved household waste water treatment and recycling system which provides in the apparatuses and methods of the prior art some of the advantages thereof, while simultaneously overcoming some of the disadvantages normally associated therewith.

Even still another object of the present invention is to provide a new and improved household waste water treatment and recycling system for allowing household waste water to be treated and then recycled.

Lastly, it is an object of the present invention to provide a new and improved household waste water treatment and recycling system comprising a rigid septic tank having a hollow body with a top opening and a lid secured over the top opening to thereby create an enclosed gas chamber, the body having a first chamber, a second chamber, a third chamber, and a fourth chamber formed therein, and with the third chamber having a layer of granulated charcoal disposed therein and the fourth chamber having a layer gravel disposed therein, the body further having an input port formed thereon and placed in communication with the first chamber, a filtering port thereon allowing communication between the third and the fourth chambers, and an output port formed thereon and placed in communication with the fourth chamber, the input port securable to a waste water line of a home for allowing waste water to enter the body, and the output port allowing treated water to exit the body, and with the lid having an evacuation outlet formed thereon, the septic tank further having a first channel for allowing communication between the first chamber and the second chamber, a second channel for allowing communication between the second chamber and the third chamber, a third channel for allowing communication between the third chamber and the fourth chamber, and with the first chamber accepting waste water from the waste water line via the input port, the second chamber accepting the waste water from the first chamber via the first channel after it has aged a time, the gas chamber accepting combustible gas that is generated from aging the waste water, the third chamber accepting the aged waste water from the second chamber via the second channel and with the layer of granulated charcoal therein eliminating noxious odors present in the aged waste water, the fourth chamber accepting the aged waste water from the third chamber via the third channel and with the layer of course gravel therein particulates contained within the aged waste water to thereby create treated water, and with the output port receiving the treated water from the fourth chamber and the evacuation outlet receiving combustible gas from the gas chamber.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a view of the upper gas holding tank of the present invention.

FIG. 4 is a cross-sectional view of the gas holding tank of the present invention taken along the line 4—4 of FIG. 3.

FIG. 5 is a cross-sectional view of the septic tank of FIG. 2.

FIG. 6 is a detail view of the door that allows access to the tank for testing water.

The same reference numerals refer to the same parts through the various Figures.

DESCRIPTION OF THE PREFERRED EMBODIMENT

Figure 1:
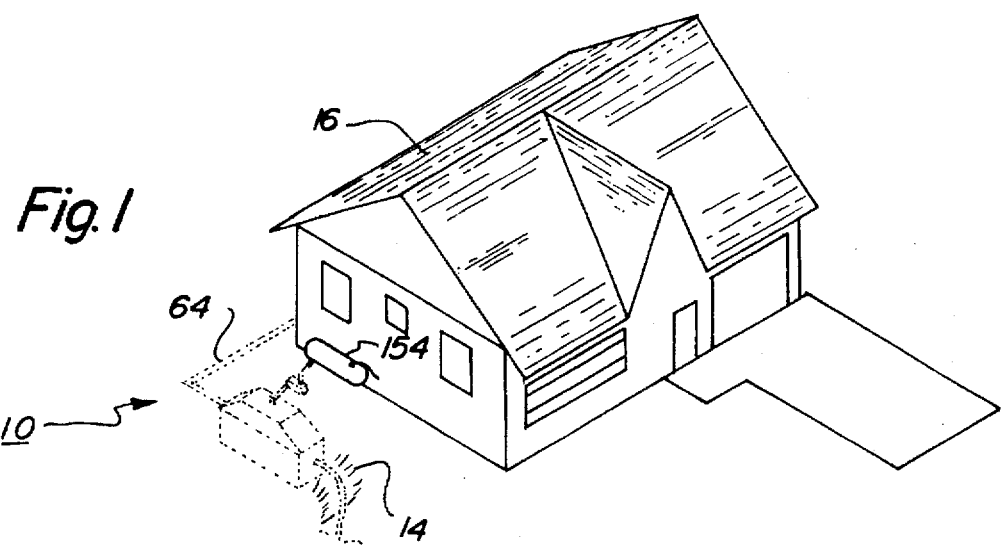
FIG. 1 is a perspective view of the preferred embodiment constructed in accordance with the principles of the present invention secured within the ground and coupled to a waste water line of a home.

With reference now to the drawings, and in particular, to FIG. 1 thereof, the preferred embodiment of the new and improved household waste water treatment and recycling system embodying the principles and concepts of the present invention and generally designated by the reference number 10 will be described.

The preferred embodiment of the present invention comprises a plurality of components. In their broadest context, such components include a septic tank, gas filtering chamber, gas holding tank, water holding tank, and electric water pump. Such components are individually configured and correlated with respect to each other to allow household waste and gray water to be treated and then recycled.

Figure 2:
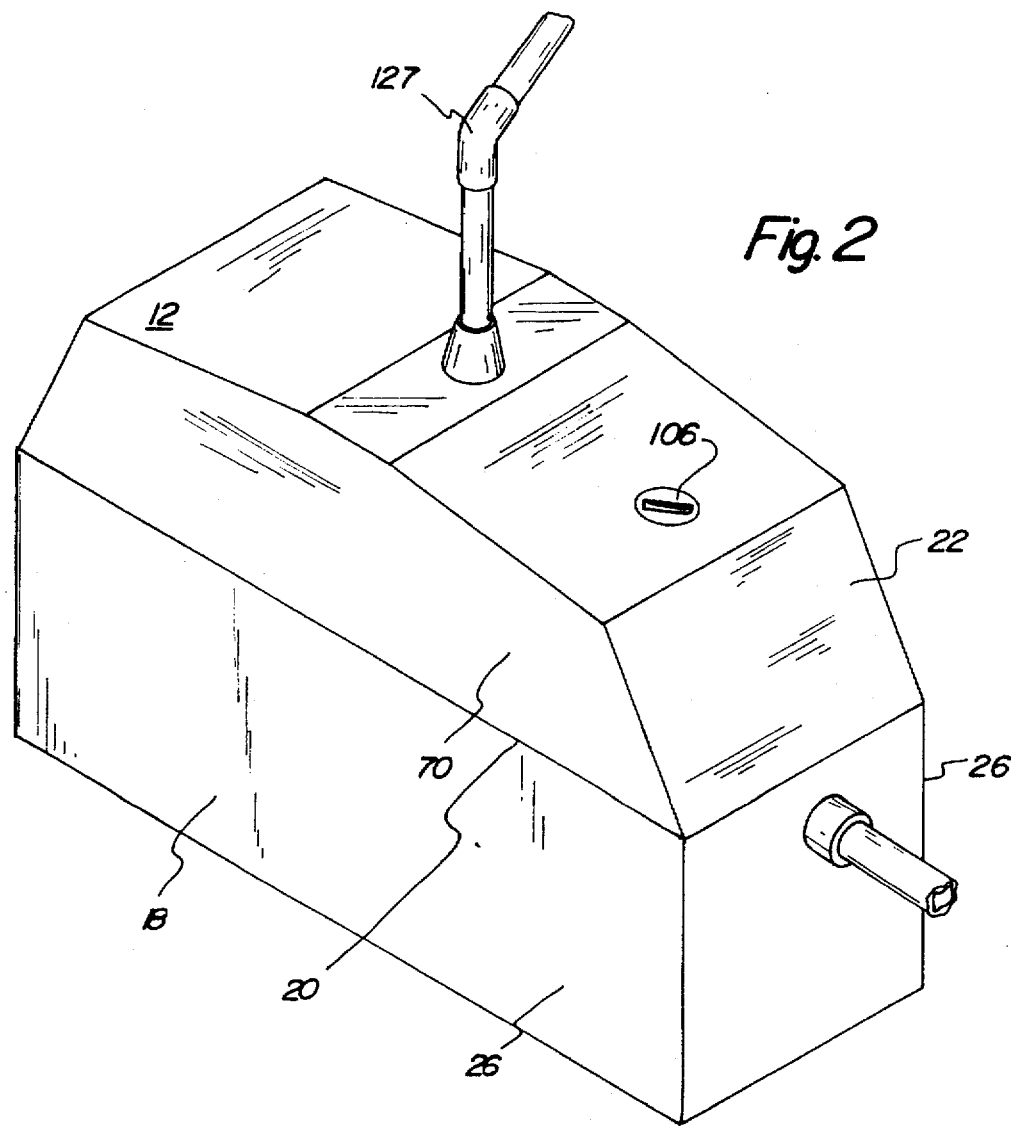
FIG. 2 is a perspective view of the preferred embodiment constructed in accordance with the principles of the present invention.

Specifically, the present invention includes a septic tank 12 as shown in FIG. 2. The septic tank is securable within a section of ground 14 near a home 16. As shown in FIG. 2, the septic tank has a hollow box-shaped metal or plastic body 18 with a top opening 20. A removable metal or plastic lid 22 is secured over the top opening.

Referring to FIG. 5, the body 18 of the septic tank includes a rectangular and horizontal bottom wall 24. Two spaced and opposed rectangular vertical side walls 26 (FIG. 2) and two spaced and opposed rectangular vertical short end walls 28 are extended upwards from the bottom wall 24 to define a hollow interior 30. The body also includes a first interior wall 40, a second interior wall 42, and a third interior wall 44. The interior walls are parallel to each other and positioned vertically. Furthermore, the interior walls are extended across the interior of the body and coupled between its side walls 26 to thereby create a first chamber 46, a second chamber 48, a third chamber 50, and a fourth chamber 52. The chambers are aligned in sequence and have a generally rectangular cross-section. The third chamber 50 has a layer of granulated charcoal 54 disposed therein. This layer of charcoal acts as a first stage water filter. The fourth chamber 52 has a lower layer of coarse gravel 56 disposed therein to act as a second stage water filter. In addition, the fourth chamber has an upper layer of fine gravel 58 disposed therein to act as a third and final stage water filter. The third interior wall 44 also has a filtering port 59 formed on a lower extent thereof. The filtering port allows communication between the third chamber and fourth chamber to allow water flow through the first through third filtering stages, respectively.

The body also has a tubular input port 60 formed on one of its end walls 28. The input port is placed in communication with the first chamber 46. The body also has a tubular output port 62 formed on its other end wall. The output port is placed in communication with the fourth chamber 52. The input port 60 is securable to a waste water line 64 of the home 16 for allowing waste water to enter the body 18 as shown in FIGS. 1 and 2. The output port 62 allows treated water to exit the body.

As best illustrated in FIG. 2, the lid 22 has two spaced opposed and vertical long walls 70. An upper horizontal rectangular top wall 72, a pair of opposed angled lower rectangular walls 74, and a pair of opposed angled intermediate walls 76 are extended between the long walls 70 to thereby create a gas chamber 80 as shown in FIG. 5. The gas chamber 80 is located directly above the interior 30 of the body.

The lid 22 has an upper extent with a centrally located and conical evacuation outlet 82 formed thereon. The lid also has a lower extent with a first dividing wall 84 coupled thereto at a location above the first interior wall of the body. The first dividing wall is extended downwards into the second chamber 48 to create a first channel 86. The first channel allows communication between the first chamber 46 and the second chamber 48. A second dividing wall 88 is coupled to a lower extent of the lid at a location above the second interior wall 42 of the body. The second dividing wall is extended downwards into the third chamber 50 to create a second channel 90. The second channel allows communication between the second chamber 48 and the third chamber 50. The first and second dividing walls have an upper extent with a generally T-shaped cross-section and lower extent with a generally inverted J-shaped cross-section. The lid also has a first horizontal rectangular planar partition 92 coupled thereto at a location above the first chamber of the body. The first partition 92 is used for mitigating splash of waste water 94 entering through the input port 60 of the body. A second horizontal rectangular planar partition 96 is also included and coupled to a lower extent of the lid at a location above the third interior wall 44 of the body. The second partition 96 defines a third channel 98 used for regulating overflow of water between the third chamber 50 and the fourth chamber 52. A third horizontal rectangular planar partition 100 is coupled to a lower extent of the lid at a location above the fourth chamber of the body. The third partition is used for regulating flow of recycled water that exits through the output port 62 of the body.

In addition, the lid includes a threaded bore 102 that is formed on one of the intermediate walls 76 as shown in FIG. 6. A disk-shaped and outwardly threaded openable door 104 is removably secured within the bore 102. The door is openable through actuation of a recessed handle 106 shown in FIG. 2. The door 104 is positioned above the fourth chamber 52 as shown in FIG. 5 and allows access to the water therein for testing purposes. Thus, the door can be opened and a sample of water taken in order to ascertain its suitability for consumption.

In operation, the first chamber 46 accepts waste water 94 from the waste water line 64 through the input port 60. The second chamber 48 accepts the waste water from the first chamber 46 through the first channel 86 after it has aged a time. The time the water is aged is a function of the flow into the first chamber as well as the relative depth of the first chamber for accommodating such flow. The gas chamber 80 accepts combustible gas that is generated from aging the waste water. A major component of the combustible gas generated is methane. The third chamber 50 accepts the aged waste water from the second chamber through the second channel. The layer of granulated charcoal 54 within the second chamber eliminates noxious odors present in the aged waste water. The fourth chamber 52 accepts the aged waste water from the third chamber 50 through the filtering port 59. The layer of coarse gravel 56 within the third chamber removes coarse particulates contained within the aged waste water. The layer of fine gravel 58 then removes the fine particulates contained within the aged waste water to thereby create water that has been treated and is now suitable for consumption. The output port 62 of the body receives the treated water from the fourth chamber. The evacuation outlet 82 receives the combustible gas from the gas chamber.

As shown in FIGS. 3 and 4, a rigid metal or plastic hollow rectangular box-shaped gas filtering chamber 110 is positioned above the septic tank and within the ground 14 shown in FIG. 1. The gas filtering chamber has a pair of spaced interior walls 112 secured thereacross to define a first holding cell 114, a centrally located holding cell 116, and an upwardly positioned third holding cell 118. Each interior wall 112 has a plurality of elongated tubular channels 120 formed thereon. The channels allow communication between the first and the second holding cells as well as the second and the third holding cells. The gas holding chamber also has an input port 122 formed thereon. The input port 122 is placed in communication with the first holding cell 114 and is also coupled to the evacuation outlet 82 of the septic tank with a pipe 124. A collar 123 is used for connecting the pipe to the outlet 122. As shown in FIG. 2, an elbow 127 can be added to direct the pipe appropriately. An amount of granulated charcoal 126 is disposed within the second holding cell. The charcoal is used for removing noxious fumes from the combustible gas. In addition, the gas filtering chamber has an output port 130. Output port 130 is in communication with the third holding cell 118 for receiving filtered combustible gas exiting the second holding cell.

Figure 7:
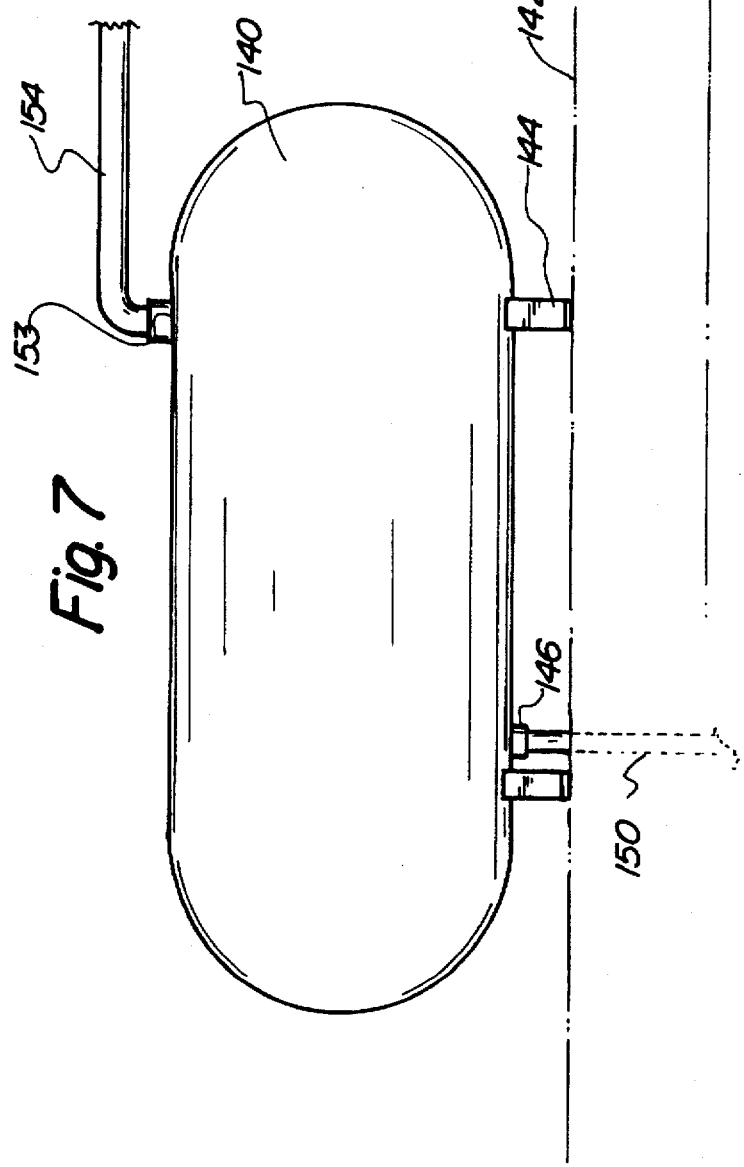
FIG. 7 is a side-elevational view of the gas tank of the present invention used for holding gas generated from water treatment for use within a home.

A rigid metal gas holding tank 140 is also provided and positioned above the gas filtering chamber as shown in FIG. 7. The gas holding tank 140 is supported on the surface 142 of the ground with legs 144. The gas holding tank has an input port 146 that is coupled to the output port 130 of the gas filtering chamber 110 with a pipe 150 and collar 152 as shown in FIG. 4. The gas holding tank receives and stores the filtered combustible gas. The tank 140 also has an output port 153. The output port 153 is securable to a gas line 154 of the home 16 to thereby provide access to the combustible gas for use for heating, cooking, or similar activities.

Figure 8:
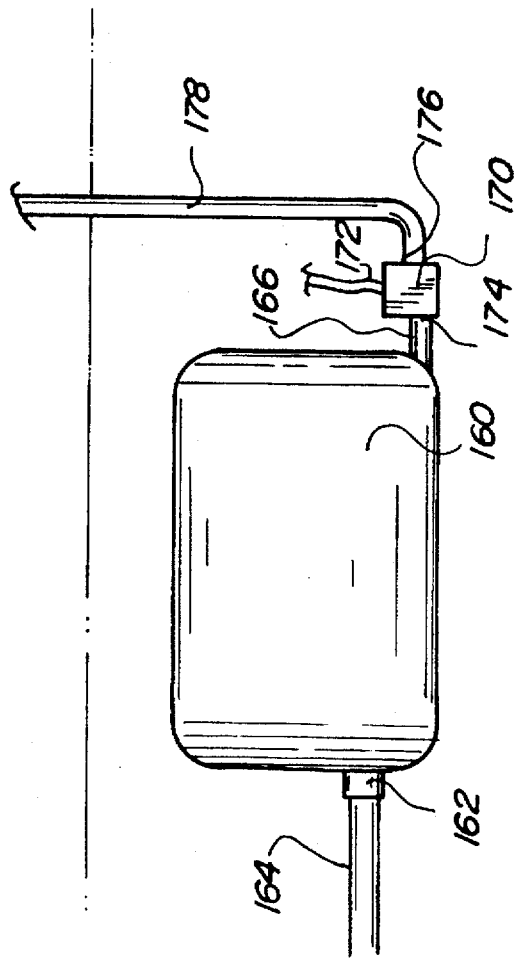
FIG. 8 is a side-elevational view of an optional tank for holding recycled gray water therein for use such as watering a yard.

Preferably, the treated water from the output port 62 of the body drains into the ground 14 or a stream. Alternatively, as shown in FIG. 8, a water holding tank 160 is provided for storing the treated water. The water holding tank has an input port 162 that is coupled to the output port 62 of the septic tank with a pipe 164. The water holding tank receives the treated water for storage. Lastly, the water holding tank includes an output port 166 for delivering the treated water.

An electric water pump 170 is provided with the water holding tank. The pump is coupleable to an external electrical power source such as conventional household power through cabling 172. The water pump has an input port 174 that is securable to the output port 166 of the water holding tank. The pump also has an output port 176 that is securable to a faucet line 178 of the home. The pump is used to transfer the treated water at a given pressure from the water holding tank to the faucet line for reuse in the home.

The present invention allows a home owner to benefit from gas generated as a result of gray water recycling for heating and cooking. In addition, a homeowner can benefit from the recycling of water for gardening purposes. The present invention is environmentally sound and eliminates the use of large treatment plants for recycling gray water. The present invention, is easily maintained and generates no odor. The water quality of the present invention is easily monitored at its outflow. The present invention provides an attractive substitute for currently used septic tanks.

The present invention described further has the potential of far more widespread application of use than just household water treatment and recycling. Constructed to appropriate dimensions, the components of the invention described herein could be utilized by any sized building that houses a commercial treatment and recycling operation, or by any industrial facility.

Properly engineered and correctly installed, this invention could be especially valuable to industries whose production processes require a very large volume of water and if these processes result in the pollution of water used. Purifying and recycling the same water again and again through a high water volume operation would result in a significant cost reduction in acquiring that water.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A household waste water treatment and recycling system for allowing household waste water to be treated and then recycled comprising, in combination:

a rigid septic tank securable within a section of ground near a home, the septic tank having a hollow rectangular box-shaped body with a top opening and a lid secured over the top opening, the body having a rectangular horizontal bottom wall with two spaced opposed rectangular vertical side walls and two spaced opposed rectangular vertical short end walls extending upwards therefrom to define a hollow interior, the body further having a first, a second, and a third vertical interior wall extended across the interior and coupled between the side walls to create a first chamber, a second chamber, a third chamber, and a fourth chamber, respectively, and with the third chamber having a layer of granulated charcoal disposed therein and the fourth chamber having a lower layer of coarse gravel disposed therein and an upper layer of fine gravel disposed therein, and with the third interior wall having a filtering port formed thereon on a lower extent thereof for allowing communication between the third and the fourth chambers, the body additionally having an input port formed on one of the end walls and placed in communication with the first chamber, and an output port formed the other end wall and placed in communication with the fourth chamber, the input port securable to a waste water line of the home for allowing waste water to enter the body, and the output port allowing treated water to exit the body, the lid having two spaced opposed vertical long walls with an upper horizontal rectangular top wall, a pair of opposed angled lower rectangular ends walls, and a pair of opposed angled intermediate walls extended therebetween to create a gas chamber located above the interior of the body, the lid further having an upper extent with a centrally located evacuation outlet formed thereon and a lower extent having a first dividing wall coupled thereto at a location above the first interior wall of the body and extended downwards into the second chamber to create a first channel for allowing communication between the first chamber and the second chamber, a second dividing wall coupled thereto at a location above the second interior wall of the body and extended downwards into the third chamber to create a second channel for allowing communication between the second chamber and the third chamber, a first horizontal planar partition coupled thereto at a location above the first chamber of the body for mitigating splash of waste water entering through the input port of the body, a second horizontal planar partition coupled thereto at a location above the third interior wall of the body to thereby define a third channel for regulating flow of water between the third chamber and the fourth chamber, a third horizontal planar partition coupled thereto at a location between the fourth chamber of the body for regulating flow of recycled water exiting through the output port of the body, and an openable door removably secured to the intermediate wall located above the fourth chamber for allowing access to the water in the fourth chamber for testing purposes, and with the first chamber accepting waste water from the waste water line via the input port, the second chamber accepting the waste water from the first chamber via the first channel after it has aged a time, the gas chamber accepting combustible gas that is generated from aging the waste water, the third chamber accepting the aged waste water from the second chamber via the second channel and with the layer of granulated charcoal therein eliminating noxious odors present in the aged waste water, the fourth chamber accepting the aged waste water from the third chamber via the third channel and with the layer of coarse gravel therein removing coarse particulates contained within the aged waste water and the layer of fine gravel removing fine particulates contained within the aged waste water to thereby create treated water, and with the output port receiving the treated water from the fourth chamber and the evacuation outlet receiving combustible gas from the gas chamber;

a rigid hollow rectangular box-shaped gas filtering chamber positioned above the septic tank, the gas filtering chamber having a pair of spaced interior walls secured thereacross to define a first holding cell, a centrally located second holding cell, and a third holding cell, and with each interior wall having a plurality of channels formed thereon for allowing communication between the first and the second holding cells and the second and the third holding cells, the gas holding chamber further having an input port formed thereon in communication with the first holding cell and coupled to the evacuation outlet of the septic tank with a pipe for receiving combustible gas therefrom, an amount of granulated charcoal disposed within the second holding cell for removing noxious fumes from the combustible gas, and an output port in communication with the third holding cell for receiving filtered combustible gas exiting the second holding cell;

a gas holding tank positioned above the gas filtering chamber and having an input port coupled to the output port of the gas filtering chamber with a pipe for receiving and storing the filtered combustible gas and an output port securable to a gas line of the home for providing access to the combustible gas for use;

a water holding tank having an input port coupled to the output port of the septic tank with a pipe for receiving and storing the treated water and an output port for delivering the treated water; and an electric water pump coupleable to an external electric power source and having an input port securable to the output port of the water holding tank and an output port securable to a faucet line of the home, and with the pump being used to transfer the treated water from the water holding tank to the faucet line for reuse.

2. A household waste water treatment and recycling system for allowing household waste water to be treated and then recycled comprising, in combination:

a rigid septic tank securable within a section of ground near a home, the septic tank having a hollow rectangular box-shaped body with a top opening and a lid removably secured over the entire top opening, the body having a rectangular horizontal bottom wall with two spaced opposed rectangular vertical side walls and two spaced opposed rectangular vertical short end walls extending upwards therefrom to define a hollow interior, the body further having a first, a second, and a third vertical interior wall extended across the interior and coupled between the side walls to create a first chamber, a second chamber, a third chamber, and a fourth chamber, respectively, and with the third chamber having a layer of granulated charcoal disposed therein and the fourth chamber having a lower layer of coarse gravel disposed therein and an upper layer of fine gravel disposed therein, and with the third interior wall having a filtering port formed thereon on a lower extent thereof for allowing communication between the third and the fourth chambers, the body additionally having an input port formed on one of the end walls and placed in communication with the first chamber, and an output port formed the other end wall and placed in communication with the fourth chamber, the input port securable to a waste water line of the home for allowing waste water to enter the body, and the output port allowing treated water to exit the body, the lid having two spaced opposed vertical long walls with an upper horizontal rectangular top wall, a pair of opposed angled lower rectangular ends walls, and a pair of opposed angled intermediate walls extended therebetween to create a gas chamber located above the interior of the body, the lid further having an upper extent with a centrally located evacuation outlet formed thereon and a lower extent having a first dividing wall coupled thereto at a location above the first interior wall of the body and extended downwards into the second chamber to create a first channel for allowing communication between the first chamber and the second chamber, a second dividing wall coupled thereto at a location above the second interior wall of the body and extended downwards into the third chamber to create a second channel for allowing communication between the second chamber and the third chamber, a first horizontal planar partition coupled thereto at a location above the first chamber of the body for mitigating splash of waste water entering through the input port of the body, a second horizontal planar partition coupled thereto at a location above the third interior wall of the body to thereby define a third channel for regulating flow of water between the third chamber and the fourth chamber, a third horizontal planar partition coupled thereto at a location between the fourth chamber of the body for regulating flow of recycled water exiting through the output port of the body, and an openable door removably secured to the intermediate wall located above the fourth chamber for allowing access to the water in the fourth chamber for testing purposes, and with the first chamber accepting waste water from the waste water line via the input port, the second chamber accepting the waste water from the first chamber via the first channel after it has aged a time, the gas chamber accepting combustible gas that is generated from aging the waste water, the third chamber accepting the aged waste water from the second chamber via the second channel and with the layer of granulated charcoal therein eliminating noxious odors present in the aged waste water, the fourth chamber accepting the aged waste water from the third chamber via the third channel and with the layer of coarse gravel therein removing coarse particulates contained within the aged waste water and the layer of fine gravel removing fine particulates contained within the aged waste water to thereby create treated water, and with the output port receiving the treated water from the fourth chamber and the evacuation outlet receiving combustible gas from the gas chamber;

a gas filtering chamber having an input port formed thereon in communication with the first holding cell and coupled to the evacuation outlet of the septic tank with a pipe for receiving combustible gas therefrom and an output port in communication with the third holding cell for receiving filtered combustible gas exiting the second holding cell; and a gas holding tank positioned having an input port coupled to the output port of the gas filtering chamber with a pipe for receiving and storing the filtered combustible gas and an output port securable to a gas line of the home for providing access to the combustible gas for use.

* * * * *